United States Patent
Bauerle

(10) Patent No.: US 7,219,539 B1
(45) Date of Patent: May 22, 2007

(54) SYSTEM AND METHOD FOR ADJUSTING THE FUEL ECONOMY RANGE CALCULATION FOR FLEX FUEL VEHICLES

(75) Inventor: Paul A. Bauerle, Fenton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/398,928

(22) Filed: Apr. 6, 2006

(51) Int. Cl.
*G01L 3/26* (2006.01)
(52) U.S. Cl. ............................................ 73/113
(58) Field of Classification Search ............... 73/112, 73/113, 114, 116; 701/99, 101; 340/438, 340/439, 450, 450.2
See application file for complete search history.

(56) References Cited

U.S. PATENT DOCUMENTS

| | | | | |
|---|---|---|---|---|
| 4,244,210 A | * | 1/1981 | Prohaska et al. | 73/113 |
| 4,845,630 A | * | 7/1989 | Stephens | 701/123 |
| 5,995,886 A | * | 11/1999 | Tanaka et al. | 701/30 |
| 6,467,337 B2 | * | 10/2002 | Sadahiro et al. | 73/113 |
| 2004/0073386 A1 | * | 4/2004 | Benedetti | 702/55 |

* cited by examiner

*Primary Examiner*—Eric S. McCall
(74) *Attorney, Agent, or Firm*—Laura C. Hargitt

(57) ABSTRACT

A flex fuel vehicle mileage range calculating system and method as described herein can effectively be utilized to calculate the mileage range value corresponding to a fuel mixture. The system is suitable for use in all vehicles capable of using various fuel mixtures. The system can calculate a scale factor, update the mileage range value based on the scale factor and, display the updated mileage range value on an on-board display element to correspond to the fuel mixture in the fuel tank.

20 Claims, 3 Drawing Sheets

SYSTEM AND METHOD FOR ADJUSTING THE FUEL ECONOMY RANGE CALCULATION FOR FLEX FUEL VEHICLES

TECHNICAL FIELD

The present invention generally relates to flex fuel vehicle mileage range calculating systems, and more particularly relates to calculations for adjusting fuel consumption values for updating the mileage range value corresponding to the fuel mixture in a fuel tank.

BACKGROUND OF INVENTION

Using alternate fuel sources for vehicles is becoming a popular option in many countries. Vehicles capable of consuming different fuel types are referred to as "flex fuel vehicles" (FFV). At the time of this writing, there are approximately 5 million flex fuel vehicles in the U.S.A.

Limited production and increasing prices of petroleum derived gasoline motivates consideration of alternative fuels. For example, ethanol is an alternative automotive fuel that is generally made from the fermentation of relatively abundant renewable crops like corn, sugar cane, sugar beets, and cellulose. Ethanol is a liquid fuel with similar properties to gasoline. Ethanol can be readily mixed with gasoline and used in an internal combustion engine. Mixtures of up to 10% ethanol can be used in a standard automobile engine without modification. Flex fuel engines and vehicles can use any mixture of gasoline and ethanol.

The percentage of ethanol in fuel is commonly referred to by the letter "E" followed by the percentage of ethanol; the remaining content is gasoline. Therefore, E100 is pure ethanol, E0 is pure gasoline, and E10 is a mixture of 10% ethanol and 90% gasoline. The percentage of ethanol affects the performance of an engine and the vehicle using it. The energy content of E100 is approximately 76,000 BTUs while typical E0 fuel has approximately 114,000 BTUs. The higher the E percentage, the more fuel is needed to produce the same amount of energy. Therefore, an increase in the E percentage will usually result in a decrease in the vehicle mileage range for a given quantity of fuel, for example a full tank.

The E percentage can change significantly after a refueling, especially when switching fuel types. Using existing technology, a mileage range value on the vehicle dashboard display will not immediately update itself based on a new fuel blend or mixture in the fuel tank. The vehicle may have to be driven many miles or sometimes run through a full tank of fuel before the mileage range is accurate.

Conventional fuel range calculations do not account for the type of fuel in the vehicle. Most conventional vehicle mileage range displays use the average fuel economy for a previous driven distance, such as the last 25 miles, to calculate the mileage range value. This can lead to an inaccurate mileage range display after fueling if a significant amount of lower or higher energy fuel is added to the tank because the range is calculated from the energy content of the previous fuel mix rather than the present fuel mix. For example, if the fuel is changed from E0 to E85 it can have a significant impact on the fuel consumption value and it would take about 25 miles after switching fuel types to make a difference in the mileage range value calculation.

Accordingly, it is desirable to have a way to calculate the mileage range value for vehicles capable of using various fuel mixtures, and to update the mileage range displayed on an on-board display element to a more meaningful value corresponding to each fuel mixture used after each refueling event. Other desirable features and characteristics of the present invention will become apparent from the subsequent detailed description and the appended claims, taken in conjunction with the accompanying drawings and the foregoing technical field and background.

SUMMARY OF INVENTION

A system, according to an example embodiment of the invention, provides a way for the mileage range display of a vehicle to be adjusted to reflect the possible drivable distance when the mixture of fuel types in the fuel tank changes. The system includes a flex fuel vehicle mileage range calculating system that can be effectively utilized in all vehicles capable of using various fuel mixtures. Since the flex fuel mileage range calculation system improves the accuracy of the fuel range calculation, it allows customers to better manage fuel stops.

The mileage range calculation technique according to an example embodiment of the invention obtains a current fuel parameter value corresponding to the fuel in the fuel tank and a past fuel parameter value corresponding to the fuel in the fuel tank prior the refueling event. It then calculates a scale factor based on the current fuel parameter value and the past fuel parameter value. The scale factor is used to adjust a past fuel consumption value to generate an updated mileage range value based on the fuel consumption value for the new fuel mixture. The indicia of the updated mileage range value corresponding to the adjusted fuel consumption value for different types of fuel mixture may be displayed on an on-board display element.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

Figure 1:
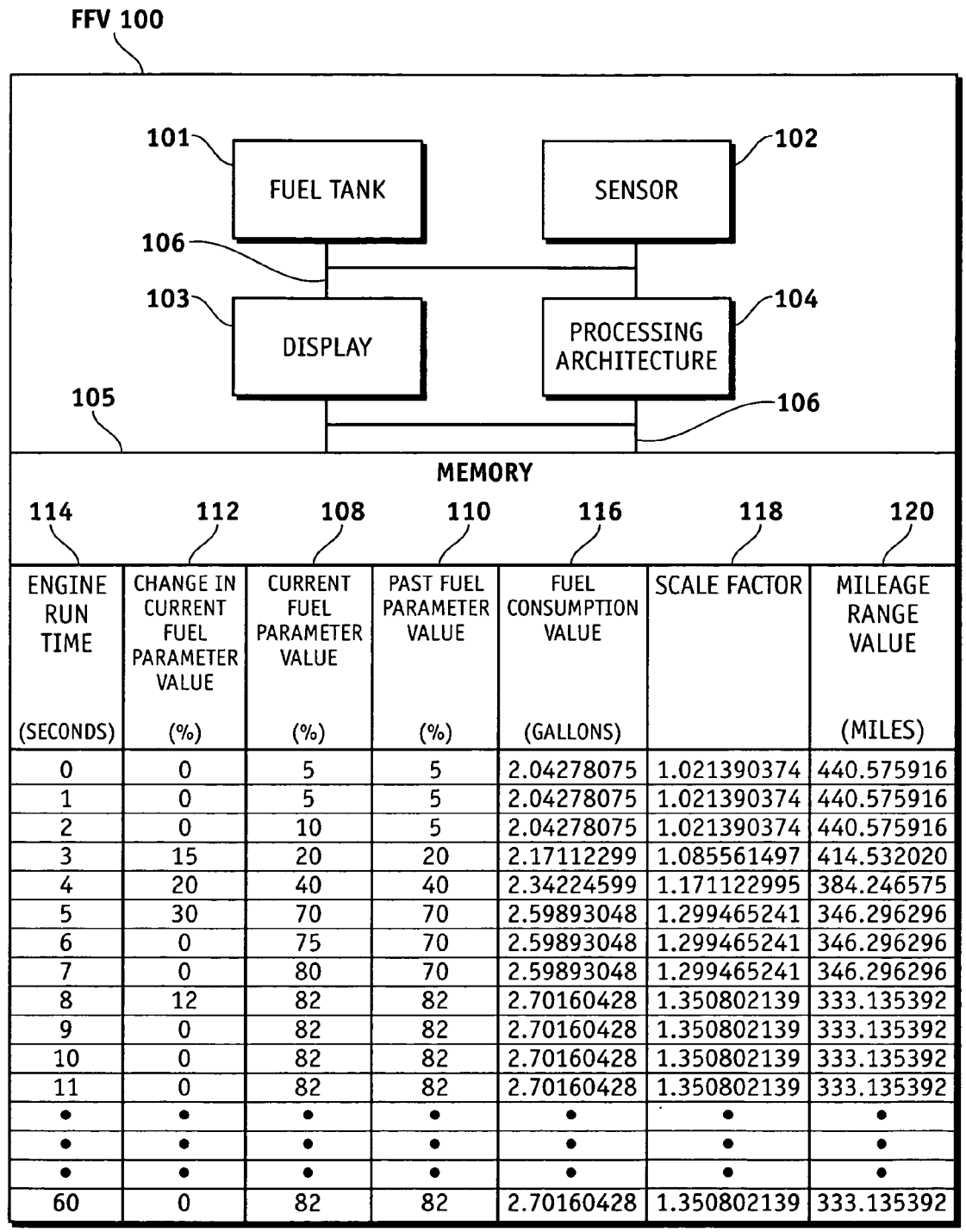
FIG. 1 is a schematic representation of a FFV mileage range calculation system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of different vehicle configurations and that the particular system described herein is merely one exemplary application for the invention.

For the sake of brevity, conventional techniques and features related to vehicle computer systems, vehicle electronic control units, vehicle network communication, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically.

Thus, although the schematic diagrams shown herein depict example arrangements of elements, additional intervening elements, devices, features, or components may be present in an actual embodiment (assuming that the functionality of the system is not adversely affected).

The system described herein provides a way for the mileage range display of a vehicle to be adjusted to reflect the possible drivable distance when the fuel mixture type in the fuel tank changes. The system employs a flex fuel vehicle mileage range calculating system that can be effectively utilized in all vehicles capable of using various fuel mixtures. In one example embodiment, the engine control module (ECM) of a flexible fuel vehicle (FFV) contains a stored data value (EX) reflecting a current fuel parameter value (such as the percentage of ethanol in the fuel any time after refueling) and a stored data value (PEX) reflecting a past fuel parameter value (such as the percentage of ethanol in the fuel tank any time prior to refueling). After fuel is added to the tank, a scaling factor is calculated based on EX and PEX and stored past fuel consumption values are adjusted by the scaling factor and the mileage range value (MRV) is updated and displayed.

FIG. 1 is a schematic representation of a FFV 100 having a mileage range calculating system configured in accordance with an example embodiment of the invention. The various block modules depicted in FIG. 1 may be realized in any number of physical components or modules located throughout the FFV 100. A practical FFV 100 may include a number of electrical control units (ECUs), computer systems, and components other than those shown in FIG. 1. Conventional subsystems, features, and aspects of FFV 100 will not be described in detail herein.

FFV 100 generally includes a fuel tank 101, a sensor 102, a display 103, a processing architecture 104, a memory 105, and a communication bus 106. The fuel tank 101 is a container for several gallons of fuel attached to vehicle. The sensor 102 is generally a device for measuring the percentage of ethanol or oxygen for the fuel in the fuel line, tank or by other means. The sensor 102 may also measure the fuel remaining in the fuel tank at any given time. The processing architecture 104 is generally a logic processing device as described in detail below. The memory 105 is a data storage area that is formatted to support the operation of FFV 100. In practice, these elements may be coupled together using at least one data communication bus 106 or any suitable interconnection architecture, technique, or arrangement.

Fuel tank 101 contains the fuel for the vehicle. Prior to a fueling event, the fuel in the fuel tank 101 is characterized by a past fuel parameter value related to ethanol or oxygen content. After a fueling event, the fuel in the fuel tank is characterized by a present fuel parameter value related to the current ethanol or oxygen content.

Sensor 102 is configured to measure the percentage of alternative fuel in the fuel tank 101. The sensor 102 can make measurements by directly measuring the fuel at the fuel tank 101 or other locations not shown in FIG. 1, such as the fuel line, carburetor, exhaust oxygen sensor, fuel injector or other locations. Thus, sensor 102 may be located in the fuel tank 101 or other locations not shown in FIG. 1, including, without limitation, the fuel line, carburetor, or other locations. The sensor 102 can measure the ethanol, oxygen content, or use other measures of the fuel mixture. The measurement by sensor 102 yields the fuel parameter value of the fuel tank.

The processing architecture 104 is configured to calculate the mileage range value for the FFV 100. Although only one processing block is shown in FIG. 1, a practical implementation may utilize any number of distinct physical and/or logical processors, which may be dispersed throughout FFV 100. In practice, processing architecture 104 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

Processing architecture 104 obtains the current fuel parameter from sensor 102. As used herein a "fuel parameter" may be the percentage of ethanol in the fuel, a measurement of oxygen content in the fuel, or other measures of the fuel mixture. FFV 100 also obtains a past fuel parameter value and a past fuel consumption value stored in memory 105, and calculates a scale factor based on the current fuel parameter and the past fuel parameter value to adjust the past fuel consumption value. As used in this example, the fuel consumption value is defined as fuel used. For example a fuel consumption value may be 2.043 gallons. FFV 100 also generates an updated mileage range value based on the adjusted fuel consumption value. As used in this example, the mileage range value is defined as the mileage range that the vehicle may travel with a full tank of fuel. For example a mileage range value may be 440.6 miles. In this embodiment, the display 103 is configured to indicate the adjusted mileage range value on an on-board display element. The calculation of the scale factor and the mileage range value is described in more detail below.

Memory 105 has sufficient capacity to accommodate the mileage range calculating techniques described herein. For example, memory 105 may be configured to store current fuel parameter value 108, the past fuel parameter value 110, the change in the current fuel parameter value relative to the past fuel parameter value 112, the engine run time 114, the fuel consumption value 116, the scale factors 118, and mileage range value 120. Memory 105 shows snapshots of the above variables for one example embodiment of this invention to illustrate how these variables change over time, after a fill-up. Notably, the variables in the memory 105 may not need to be stored in an array. Memory 105 may be realized as RAM memory, flash memory, ROM memory, EPROM memory, EEPROM memory, registers, a hard disk, a removable disk, a CD-ROM, or any other form of storage medium known in the art.

FFV 100, and processing architecture 104 in particular, are suitably configured to perform the mileage range calculating functions described herein. For example, FFV 100 obtains a current fuel parameter value corresponding to fuel in the fuel tank 101 after a refueling event. The mileage range value is calculated based on historical values of the past fuel consumption value along with percentage of ethanol to update the mileage displayed. The displayed mileage range may be updated if the current fuel parameter value is significantly different than the past fuel parameter value before the refueling event. For example, the historical values of the current fuel parameter and corresponding fuel consumption may be stored in a data base in memory 105. When the fuel parameter value changes, beyond a certain predetermined threshold, from what was stored in memory 105, an automatic update of the past fuel consumption value may adjust the fuel consumption value by a scale factor.

For example, when switching from E0 to E85 fuel, the mileage range calculation may adjust the fuel consumption value stored in memory 105 by a new scale factor corresponding to the change in the fuel mixture from E0 to E85. Also for this example, the mileage range calculation may update the fuel parameter value that corresponds to the historical fuel consumption value from E0 to a value corresponding to E85. Details of how the fuel consumption value is adjusted and the fuel parameter updated will be shown below.

The steps of a method or algorithm described in connection with the embodiments disclosed herein may be embodied directly in hardware, in firmware, in a software module executed by a processor, or in any practical combination thereof. In this regard, a software module may reside in memory 105 or any other suitable storage medium. In practice, memory 105 can be coupled to processing architecture 104 such that processing architecture 104 can read information from, and write information to, memory 105. Memory 105 may be integral to processing architecture 104. As an example, processing architecture 104 and memory 105 may reside in an ASIC.

Figure 2A:
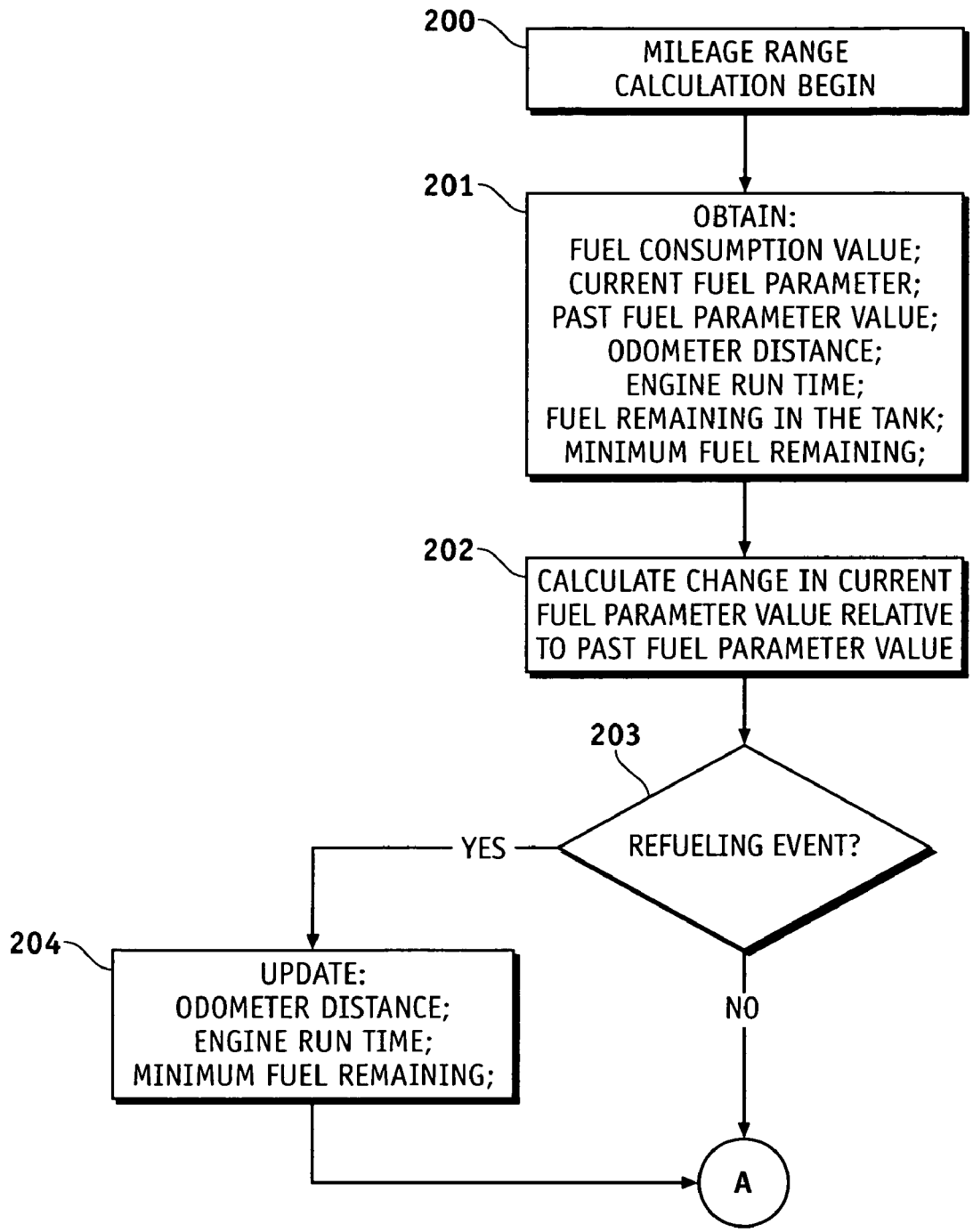
FIGS. 2A and 2B contain a flowchart of a FFV mileage range calculation process according to an example embodiment of the invention.
Figure 2B:
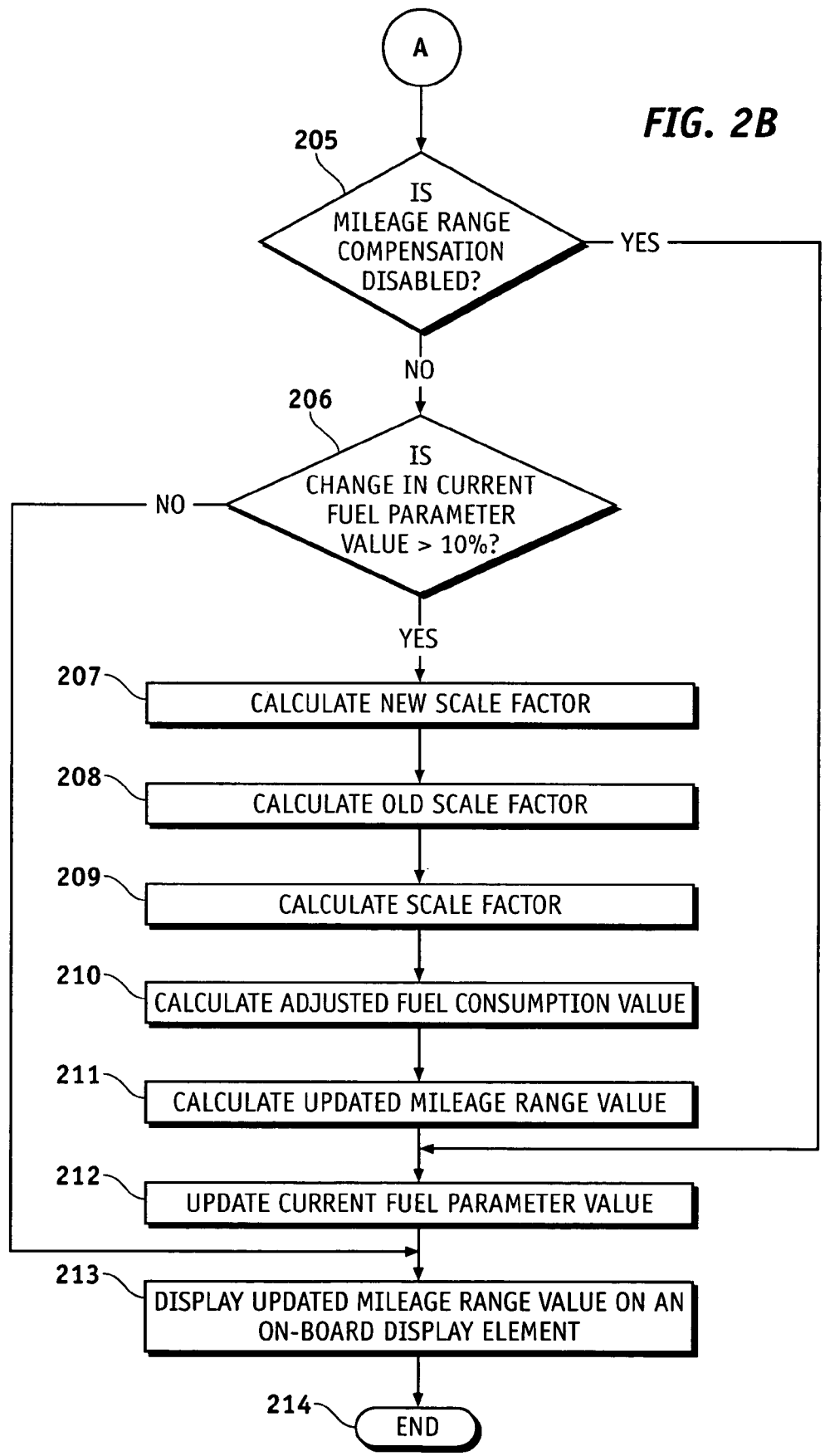

FIGS. 2A and 2B contain a flow chart of a mileage range calculating process 200. The mileage range calculating process 200 operates according to an example embodiment of the invention. The various tasks performed in connection with process 200 may be performed by software, hardware, firmware, or any combination thereof. For illustrative purposes, the following description of process 200 may refer to elements mentioned above in connection with FIG. 1. In practical embodiments, portions of process 200 may be performed by different elements of the described system, e.g., sensor 102, processing architecture 104, or memory 105. It should be appreciated that process 200 may include any number of additional or alternative tasks, the tasks shown in FIGS. 2A and 2B need not be performed in the illustrated order, and process 200 may be incorporated into a more comprehensive procedure or process having additional functionality not described in detail herein.

Mileage range calculating process 200 may begin by obtaining one or more inputs (task 201) including, without limitation: a fuel consumption value, a current fuel parameter value, a past fuel parameter value, an odometer distance, engine run time, the fuel remaining in the tank, the minimum fuel remaining in the fuel tank and other information as described herein. As used in this example the odometer distance is defined as a cumulative odometer reading for the vehicle. Also as used in this example, the engine run time is defined as the cumulative value in seconds of how long the engine has been running during each ignition cycle. The engine run time is expected to start at zero after a refueling event, but this is not necessary; for example, an engine run time may be 0 to 60 seconds. Additionally as used in this example, the minimum fuel in the tank corresponds to the fuel level from the sensor as the vehicle is driven and its fuel is used up.

Process 200 may then calculate the change in the current fuel parameter value relative to the past fuel parameter value (task 202). The past fuel parameter value is obtained from a previous mileage range calculation, as read from memory 105. If this is the first time that the mileage range calculation 200 is being performed, such as when the vehicle is first powered up in the factory, the past fuel parameter value may be initialized to a value corresponding to E0.

Process 200 may calculate change in a current fuel parameter value relative to a past fuel parameter value (task 202). Process 200 may then check for a re-fueling event. If a refueling event is detected (query task 203), then process 200 may update (task 204) the odometer distance, the engine run time, and the minimum fuel remaining in the tank to current values. Next, process 200 will check if the mileage range compensation is disabled (query task 205) due to either run time or distance since the last fueling event exceeding a predetermined threshold. For example, if the engine runtime exceeds 60 seconds or the distance since the last refueling exceeds 2 miles, the mileage range compensation is disabled. If the mileage range compensation is disabled, process 200 may simply update the current fuel parameter value (task 212). Process 200 may then display the updated mileage range value (task 213) and lead back to the task 201.

If the mileage range calculation is enabled, process 200 may check for whether the change in the current fuel parameter value (EX), calculated in task 202 above, exceeds a certain predetermined threshold (query task 206). For example, if the change in the current fuel parameter exceeds 10%, then process 200 may calculate a new scale factor (NSF) based on the current fuel parameter (EX) value (task 207) and calculate an old scale factor (OSF) (task 208) based on the past fuel parameter value (PEX).

Next, process 200 may calculate a scale factor (SF) (task 209) based on NSF and OSF to calculate an adjusted fuel consumption value (AFCV). Then process 200 may proceed to generate an updated mileage range value (MRV) (task 211) based on the AFCV (task 210). Next, process 200 may update EX (task 212) and display the MRV on an on-board display element (task 213). Mileage range calculation 200 may then end (task 214) or lead back to the task 201.

The following equations show how the NSF, SF, OSF, MRV and AFCV may be calculated when switching from E0 to E85 according to an example embodiment of the invention:

NSF is calculated based on the relationship:

$$NSF = [1 + (EX/85\%)*(RangeE0/RangeE85 - 1)],$$

where "RangeE0" is the mileage range value for E0 fuel, and "RangeE85" is the mileage range value for E85 fuel for a full tank of fuel. In one practical embodiment, RangeE0 is calculated or calibrated to be 450 miles, and RangeE85 is calculated or calibrated to be 330 miles. EX represents the current measured fuel parameter value obtained from the sensor 102 at any time.

OSF is calculated based on the relationship:

$$OSF=[1+(PEX/85\%)*(RangeE0/RangeE85-1)],$$

where PEX is the percentage of fuel parameter value from the prior execution of the mileage range calculation task 212 and OSF represents the NSF from prior execution of the mileage range calculation 200.

SF is calculated based on the relationship:

$$SF=NSF/OSF.$$

AFCV is calculated based on the relationship:

$$AFCV=\text{old fuel consumption value}*(SF).$$

MRV is updated based on the relationship:

MRV=(accumulated distance/AFCV)*fuel remaining in the fuel tank where "accumulated distance" is distance driven by the vehicle since the last time the vehicle's range calculation was reset, for example, by the customer. Memory 105 illustrates example values according to one example embodiment of the invention. In this example the accumulated distance may be 60 miles and the fuel remaining in the tank may be 15 gallons.

In this example of switching from E0 to E85, since the fuel consumption value is adjusted to appear appropriately for the E0 mileage range calculation, the mileage range displayed may show 450 miles, for a few minutes or a few miles after the refueling event depending on how well the new fuel mixes with the remaining fuel, instead of 330 miles corresponding to E85 fuel. The correct value of 330 miles for E85 appears on an on-board display element after the fuel mixes.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for calculating the mileage range for a vehicle having a fuel tank, the method comprising:
   obtaining a current fuel parameter value corresponding to fuel in the fuel tank after a refueling event;
   obtaining a past fuel parameter value corresponding to fuel in the fuel tank prior to the refueling event;
   calculating a scale factor based on the current fuel parameter value and the past fuel parameter value;
   scaling a past fuel consumption value using the scale factor to obtain an adjusted fuel consumption value; and
   generating an updated mileage range value based on the adjusted fuel consumption value.

2. A method according to claim 1, wherein calculating the scale factor is based on the relationship:
   scale factor=new scale factor/old scale factor, where the new scale factor corresponds to the current fuel parameter value and the old scale factor corresponds to the past fuel parameter value.

3. A method according to claim 2, wherein the current fuel parameter value represents a first ethanol percentage, and the past fuel parameter value represents a second ethanol percentage.

4. A method according to claim 3, wherein calculating the new scale factor is based on the relationship:
   new scale factor=[1+(first ethanol percentage/85%)*(RangeE0/RangeE85−1)], where "RangeE0" is the mileage range value for E0 fuel, and "RangeE85" is the mileage range value for E85 fuel for a full tank of fuel.

5. A method according to claim 3, wherein calculating the old scale factor is based on the relationship:
   old scale factor=[1+(second ethanol percentage/85%)*(RangeE0/RangeE85−1)], where "RangeE0" is the mileage range value for E0 fuel, and "RangeE85" is the mileage range value for E85 fuel for a full tank of fuel.

6. A method according to claim 1, wherein generating the mileage range value is based on the relationship:
   mileage range value=(accumulated distance/adjusted fuel consumption value)*fuel remaining in the fuel tank, where the accumulated distance is distance driven by the vehicle since the last time the vehicle's range calculation was reset.

7. A method according to claim 6, wherein the adjusted fuel consumption value is based on the relationship:
   adjusted fuel consumption value=old fuel consumption value*(scale factor), where the old fuel consumption value is an adjusted fuel consumption value from a prior execution of the mileage range calculation.

8. A method according to claim 6, wherein calculating the old scale factor is based on the relationship:
   old scale factor=[1+(past fuel parameter value/85%)*(RangeE0/RangeE85−1)], where "RangeE0" is the mileage range value for E0 fuel, and "RangeE85" is the mileage range value for E85 fuel for a full tank of fuel.

9. A method according to claim 8, further comprising displaying indicia of the updated mileage range value corresponding to the adjusted fuel consumption value for different types of fuel mixture.

10. A method according to claim 1, wherein the current fuel parameter value represents a first oxygen percentage, and the past fuel parameter value represents a second oxygen percentage.

11. A method according to claim 1, further comprising:
    storing the current fuel parameter value in an on-board computer memory; and
    storing the adjusted fuel consumption value in an on-board computer data base.

12. A mileage range calculation system for a vehicle having a fuel tank, the vehicle being configured to consume different types of fuel, the system comprising:
    a sensor configured to measure a current fuel parameter value corresponding to fuel in the fuel tank after a refueling event;
    a memory for storing a past fuel parameter value and a past fuel consumption value; and
    a processing architecture having processing logic configured to:
    calculate a scale factor based on the current fuel parameter value and the past fuel parameter value;

scale the past fuel consumption value using the scale factor to obtain an adjusted fuel consumption value; and generate an updated mileage range value based on the adjusted fuel consumption value.

13. A system according to claim 12, wherein the current fuel parameter value represents a first ethanol percentage, and the past fuel parameter value represents a second ethanol percentage.

14. A system according to claim 12, wherein the current fuel parameter value represents a first oxygen percentage, and the past fuel parameter value represents a second oxygen percentage.

15. A system according to claim 12, further comprising an on-board display element coupled to the processing architecture, the on-board display element being configured to display indicia of the updated mileage range value.

16. A method for updating a mileage range value for a flex fuel vehicle, the method comprising:

measuring a current fuel parameter value corresponding to fuel for the vehicle after refueling;

measuring a past fuel parameter value corresponding to fuel for the vehicle prior to the refueling;

calculating a scale factor based upon the current fuel parameter value and the past fuel parameter value;

adjusting historical fuel consumption data using the scale factor to obtain updated mileage range data; and generating an updated mileage range value based upon the adjusted historical fuel consumption data.

17. A method according to claim 16, wherein the current fuel parameter value represents a current ethanol percentage and the past fuel parameter value represents an ethanol percentage prior to the refueling.

18. A method according to claim 17, wherein the scale factor is calculated based upon the current ethanol percentage, the ethanol percentage prior to the refueling, a first range value for the vehicle corresponding to a first fuel type, and a second range value for the vehicle corresponding to a second fuel type.

19. A method according to claim 18, wherein the first fuel type corresponds to a fuel mixture which contains 85 percent ethanol and the second fuel type corresponds to a fuel mixture that contains 0 percent ethanol.

20. A method according to claim 16, further comprising obtaining a remaining fuel value corresponding to the amount of fuel remaining in the vehicle wherein the updated mileage range value is based upon the remaining fuel value.

* * * * *